United States Patent
Wagle et al.

(10) Patent No.: US 9,296,937 B2
(45) Date of Patent: Mar. 29, 2016

(54) METHOD OF DRILLING BOREHOLES WITH INVERT EMULSION DRILLING FLUIDS HAVING ENHANCED RHEOLOGY

(71) Applicant: Halliburton Energy Services, Inc., Houston, TX (US)

(72) Inventors: Vikrant Bhavanishankar Wagle, Mumbai (IN); Shadaab Syed Maghrabi, Thane (IN); Dhanashree Gajanan Kulkarni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 238 days.

(21) Appl. No.: 13/791,958

(22) Filed: Mar. 9, 2013

(65) Prior Publication Data

US 2014/0087976 A1  Mar. 27, 2014

Related U.S. Application Data

(63) Continuation-in-part of application No. 12/660,873, filed on Mar. 6, 2010, now Pat. No. 8,936,111.

(51) Int. Cl.
*C09K 8/03* (2006.01)
*C09K 8/36* (2006.01)
*E21B 43/16* (2006.01)

(52) U.S. Cl.
CPC .. *C09K 8/36* (2013.01); *E21B 43/16* (2013.01)

(58) Field of Classification Search
CPC ............. C09K 8/54; C09K 8/32; C09K 8/36; C09K 8/03; E21B 21/062; E21B 33/14
See application file for complete search history.

(56) References Cited

U.S. PATENT DOCUMENTS

| | | | |
|---|---|---|---|
| 5,905,061 A * | 5/1999 | Patel | 507/129 |
| 7,939,470 B1 | 5/2011 | Wagle et al. | |
| 2003/0144153 A1 | 7/2003 | Kirsner et al. | |
| 2004/0072696 A1* | 4/2004 | Patel | 507/100 |
| 2004/0102332 A1 | 5/2004 | Thompson et al. | |
| 2004/0259739 A1* | 12/2004 | Monfreux-Gaillard et al. | 507/117 |
| 2008/0009421 A1* | 1/2008 | Patel et al. | 507/104 |
| 2008/0194433 A1* | 8/2008 | Tehrani | 507/219 |
| 2009/0301972 A1* | 12/2009 | Hines et al. | 210/705 |
| 2011/0214864 A1 | 9/2011 | Maghrabi et al. | |

OTHER PUBLICATIONS

International Search Report and Written Opinion issued in related PCT Application No. PCT/US2014/022214, mailed Sep. 15, 2014 (10 pages).
International Preliminary Report on Patentability issued in related PCT Application No. PCT/US2014/022214, mailed Sep. 24, 2015 (9 pages).

* cited by examiner

*Primary Examiner* — Catherine Loikith
(74) *Attorney, Agent, or Firm* — Holly Soehnge; Baker Botts L.L.P.

(57) ABSTRACT

An invert emulsion drilling fluid, and a method of drilling with such fluid, having improved rheology effected with addition of a fatty dimer diamine additive in the presence of little or no lime. The drilling fluids of the present invention exhibit similar yield points and gel strengths at temperatures ranging from about 40° F. to about 375° F. or higher and at pressures ranging from about 0 psi to about 13500 psi.

27 Claims, No Drawings

METHOD OF DRILLING BOREHOLES WITH INVERT EMULSION DRILLING FLUIDS HAVING ENHANCED RHEOLOGY

RELATED APPLICATION

This application is a continuation in part of U.S. Ser. No. 12/660,873, filed Mar. 6, 2010, now issued as U.S. Pat. No. 8,936,111.

BACKGROUND OF THE INVENTION

1. Field of the Invention

The present invention relates to compositions and methods for drilling, cementing and casing boreholes in subterranean formations, particularly hydrocarbon bearing formations. More particularly, the present invention relates to methods for improving the rheology of invert emulsion drilling fluids, particularly at broad temperature ranges such as encountered in deep water, and to compositions for invert emulsion drilling fluids with good stability and high performance properties.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

An important property of the drilling fluid is its rheology, and specific rheological parameters are intended for drilling and circulating the fluid through the well bore. The fluid should be sufficiently viscous to suspend barite and drilled cuttings and to carry the cuttings to the well surface. However, the fluid should not be so viscous as to interfere with the drilling operation.

Specific drilling fluid systems are selected to optimize a drilling operation in accordance with the characteristics of a particular geological formation. Oil based muds are normally used to drill swelling or sloughing shales, salt, gypsum, anhydrite and other evaporate formations, hydrogen sulfide-containing formations, and hot (greater than about 300 degrees Fahrenheit ("° F.") holes, but may be used in other holes penetrating a subterranean formation as well.

An oil-based or invert emulsion-based drilling fluid may commonly comprise between about 50:50 to about 95:5 by volume oil phase to water phase. Such oil-based muds used in drilling typically comprise: a base oil comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. In the past, such additives commonly included organophilic clays and organophilic lignites. However, recent technology as described for example in U.S. Pat. Nos. 7,462,580 and 7,488,704 to Kirsner, et al., introduced "clay-free" invert emulsion-based drilling fluids, which offer significant advantages over drilling fluids containing organophilic clays.

As used herein and for the purposes of the present invention, the term "clay-free" (or "clayless) means a drilling fluid formulated without addition of any organophilic clays or organophilic lignites to the drilling fluid composition. During drilling, such "clay-free" drilling fluids may acquire clays and/or lignites from the formation or from mixing with recycled fluids containing clays and/or lignites. However, such contamination of "clay-free" drilling fluids is preferably avoided and organophilic clays and organophilic lignites should not be deliberately added to "clay-free" drilling fluids during drilling.

Invert emulsion-based muds or drilling fluids (also called invert drilling muds or invert muds or fluids) comprise a key segment of the drilling fluids industry, and "clay-free" invert emulsion-based muds, particularly those capable of "fragile gel" behavior as described in U.S. Pat. Nos. 7,462,580 and 7,488,704 to Kirsner, et al., are becoming increasingly popular. "Fragile gel" behavior or "fragile gel" strength generally refers to the ability of the drilling fluid to both suspend drill cuttings at rest and show a lack of a pressure spike upon resumption of drilling.

Clay-free invert emulsion drilling fluids, like INNOVERT® drilling fluid available from Halliburton Energy Services, Inc., in Duncan, Okla. and Houston, Tex., for example, have been shown to yield high performance in drilling, with "fragile gel" strengths and rheology leading to lower equivalent circulating density (ECDs) and improved rate of penetration (ROP).

A limiting factor in drilling a particular portion of a well is the mud weight (density of the drilling fluid) that can be used. If too high a mud weight is used, fractures are created in lost-circulation zones with resulting loss of drilling fluid and other operating problems. If too low a mud weight is used, formation fluids can encroach into the well, borehole collapse may occur due to insufficient hydrostatic support, and in extreme cases safety can be compromised due to the possibility of a well blowout. Many times, wells are drilled through weak or lost-circulation-prone zones prior to reaching a potential producing zone, requiring use of a low mud weight and installation of sequential casing strings to protect weaker zones above the potential producing zone. A particularly critical drilling scenario is one that combines deepwater and shallow overburden, as is typical of ultra deepwater fields in Brazil. This scenario is characterized by high pore fluid pressure, low effective stresses, low fracturing gradients and narrow mud weight windows.

Commercially available clay-free invert emulsion drilling fluids may have less than preferred rheology at low mud weights, that is, mud weights ranging from about 9 ppg to about 12 ppg, with temperatures up to about 375° F. or higher. Addition of inert solids may improve the rheology, but result in a decreased rate of penetration during drilling and loss of or decline in other benefits seen with a clay free system. Such inert solids include for example, fine sized calcium carbonate, and the term as used herein is not meant to be understood to include or refer to drill cuttings. Low mud weight or reduced density clay-free oil based invert emulsion drilling fluids also may show a decline in the desired "fragile gel" strength characteristic of clay-free invert emulsion drilling fluids.

Conventionally, low rheology invert emulsion drilling fluids are used for deepwater drilling at cold temperatures (typically about 40° F.). Thinners are typically added to an invert emulsion drilling fluid for use in deepwater cold temperatures (typically about 40° F.), to prevent a substantial increase in the rheology of the fluid. Low rheology, however, affects the drilling fluid's ability to clean the borehole and the fluid's ability to suspend barite and drill cuttings. An ideal deepwater invert emulsion drilling fluid exhibits sufficiently high and similar rheology from the rig floor to the riser and along the depth of the well. Such an invert emulsion drilling fluid is typically called a "flat rheology drilling fluid" or a "flat rheology fluid."

An invert emulsion drilling fluid having and maintaining a similar rheology along the depth of a borehole would lead to controlled equivalent circulating densities (ECDs) along the depth of the well-bore. The improved flow properties of such a fluid having similar or flat rheology would reduce the equivalent circulating density (ECD) and subsequent losses of the fluid to induced fractures in the subterranean formation. The yield point (YP) of the fluid would be easily maintained and this would contribute to efficient cuttings clearance. There would be a reduced pressure drop in the drill pipe and increased pump output in using such a fluid, which would also improve hole cleaning and reduce the cuttings load. Further, such a fluid, with a similar YP and low-shear yield point (LSYP), would also ensure the lowest possible frictional losses in the annulus and minimum hydraulic contribution to ECD. Reducing the hydraulic contribution to ECD reduces the risk of exceeding the fracture gradient of the subterranean formation Increasingly invert emulsion-based drilling fluids are being subjected to ever greater performance and cost demands as well as environmental restrictions. Consequently, there is a continuing need and industry-wide interest in new drilling fluids that provide improved performance while still affording environmental and economical acceptance, particularly for deepwater drilling applications.

SUMMARY OF THE INVENTION

The present invention provides oil-based invert emulsion drilling fluids with improved rheology at temperatures ranging from about 40° F. to about 375° F. or higher. The drilling fluids of the present invention provide a relatively controlled rheology that does not increase to levels that may fracture a subterranean formation when reduced temperatures and increased pressures are encountered, such as may occur in deepwater (at least about 1000 ft depth). The drilling fluids of the present invention also exhibit similar yield points and gel strengths at temperatures ranging from about 40° F. to about 375° F. or higher in a typical well.

The present invention also provides improved methods of drilling wellbores in subterranean formations employing oil-based invert emulsion muds or drilling fluids having a relatively flat rheological profile over a broad temperature range. As used herein, the term "drilling" or "drilling wellbores" shall be understood in the broader sense of drilling operations, which includes running casing and cementing as well as drilling, unless specifically indicated otherwise.

The invert emulsion drilling fluid of the present invention, or used in methods of the present invention, comprises an oil:water ratio preferably in the range of 50:50 to 95:5 and preferably employs a natural oil, such as for example without limitation diesel oil or mineral oil, or a synthetic base, as the oil or oleaginous phase and water comprising a salt such as, for example, calcium chloride, as the aqueous phase. The drilling fluid further comprises a rheology modifier or additive for rheology stability and particularly for a relatively flat rheological profile over a broad temperature range. Such rheology modifier is a fatty dimer diamine in the absence of lime. That is, lime is not added to the drilling fluid with the fatty dimer diamine or otherwise, and preferably the drilling fluid will contain less than about 0.3 ppb amount of lime and most preferably the drilling fluid will contain no lime at all. The fatty dimer diamine used in the invention is preferably a C36 fatty dimer diamine having the following molecular structure:

A preferred commercially available C36 dimer diamine contains C18 fatty monoamine and C54 fatty trimer triamine which are obtained during the commercial production of the dimer diamine. Generally, quantities of such a hydrophobic amine ranging from about 1 ppb to about 6 ppb are preferred and are effective even when the surrounding temperature is as low as 40° F. or above 180° F., or at a temperature in between.

The advantages of the fluids of the present invention are especially appreciated in drilling deepwater wells, although the fluids have broader utility, with potential use in drilling boreholes having a wide range of temperatures and pressures.

DETAILED DESCRIPTION OF PREFERRED EMBODIMENTS

The present invention provides an oleaginous or oil-based, invert emulsion drilling fluid with a relatively flat rheological profile over a broad temperature range, and a method of drilling boreholes in subterranean formations employing that drilling fluid. "Relatively flat" as used herein with respect to a rheological profile is a relative term based on comparison to the rheological profile of known prior art fluids employing lime. Generally, the drilling fluids of the invention are effective in a temperature range of about 40° F. to at least about 375° F. or higher. The oil base or oleaginous part of the invert emulsion drilling fluid may be a natural oil such as for example diesel oil or mineral oil, or a synthetic base such as, for example, ACCOLADE® base comprising esters or ENCORE® base comprising isomerized olefins, both available from Halliburton Energy Services, Inc., in Houston, Tex. and Duncan, Okla.

An aqueous solution containing a water activity lowering compound, composition or material, comprises the internal phase of the invert emulsion. Such solution is preferably a saline solution comprising calcium chloride (typically about 25% to about 30%, depending on the subterranean formation water salinity or activity), although other salts such as for example calcium bromide, sodium chloride, sodium bromide, and formate, or water activity lowering materials such as for example alcohol, such as for example glycerol, or sugar, known in the art may alternatively or additionally be used. Water preferably comprises less than 50%, or as much as about 50%, of the drilling fluid and the oil:water ratio preferably ranges from about 50:50 to about 95:5.

Drilling fluids of the present invention uniquely include a fatty dimer diamine additive as a rheology modifier, as will be discussed further below. Further, the drilling fluids of, or for use in, the present invention, have added to them or mixed with their invert emulsion oil base, other fluids or materials needed to comprise complete drilling fluids. Such other materials optionally may include, for example: additives for enhancing viscosity, for example, an additive having the trade name RHEMOD L™ (modified fatty acid); additives for providing temporary increased viscosity for shipping (transport to the well site) and for use in sweeps, for example, an additive having the trade name TEMPERUS™ (modified fatty acid); additives for filtration control, for example, additives having the trade names ADAPTA® and BDF-366; additives for high temperature high pressure control (HTHP) and emulsion stability, for example, an additive having the trade name FACTANT™ (highly concentrated tall oil derivative); additives for emulsification, for example, an additive having the trade name EZ MUL® NT (polyaminated fatty acid); and additives for corrosion control. All of the aforementioned trademarked products are available from Halliburton Energy Services, Inc. in Houston, Tex., and Duncan, Okla., U.S.A. Further, the drilling fluids of the invention may comprise weighting agents, such as for example barium sulfate, heamatite, calcium carbonate, and combinations thereof. As with all drilling fluids, the exact formulations of the fluids of the invention vary with the particular requirements of the subterranean formation.

The present invention advantageously eliminates the need to include additives to provide thinning at cold temperatures, for example, additives having the trade names COLD-TROL®, ATC®, and OMC2™. The present invention also advantageously eliminates the need to include an emulsifier activator such as lime. Rather, with the invert emulsion drilling fluids of the present invention, lime should preferably not be used or added, and such fluids should contain no more than about 0.3 ppb amount of lime if any at all.

A preferred commercially available drilling fluid system for use in the invention is the INNOVERT® drilling fluid system, having a paraffin/mineral oil base, available from Baroid, a Halliburton Company, in Houston, Tex. and Duncan, Okla. The INNOVERT® drilling fluid system may typically comprise one or more of the following additives, in addition to the paraffin/mineral oil base and brine, for use as an invert emulsion drilling fluid: RHEMOD™ L modified fatty acid suspension and viscosifying agent, BDF-366™ or ADAPTA™ copolymer for HPHT filtration control, particularly for use at high temperatures, and EZ MUL® NT polyaminated fatty acid emulsifier/oil wetting agent, also particularly for use at high temperatures. Commercially available INNOVERT® drilling fluid systems also typically include TAU-MOD™ amorphous/fibrous material as a viscosifier and suspension agent. However, with the present invention, where the drilling fluid system has uniquely added thereto a fatty dimer diamine additive as a rheology modifier, TAU-MOD™ material is optional.

Invert emulsion drilling fluids of the present invention, comprising fatty dimer diamine, maintain acceptable and even preferred rheology measurements in deepwater drilling and do not experience a decreased rate of penetration (and with clay-free invert emulsion drilling fluids, also do not experience a decline in desired fragile gel strength) when in use in drilling even at high pressures and high temperatures (HPHT). At HPHT conditions, at changes in pressures and temperatures from high to low and hot to cold and various other combinations, and at high pressure-low temperature conditions, the invert emulsion drilling fluids of the present invention, comprising the fatty dimer diamine, have stable rheologies that do not increase sufficiently to fracture the subterranean formation and that provide similar yield point (YP) and gel strength over wide temperature and pressure ranges. These advantages of the present invention are believed to be due to the addition of the fatty dimer diamine to the drilling fluid without the addition of or the presence of any significant amount of lime. The advantages of the present invention are especially appreciated when the drilling fluid does not also contain organophilic clay or lignite.

Preferred commercially available hydrophobic amines suitable for use in the present invention include without limitation VERSAMINE® 552 hydrogenated fatty C36 dimer diamine, and VERSAMINE® 551 fatty C36 dimer diamine, both available from Cognis Corporation (functional products) of Monheim, Germany and Cincinnati, Ohio. Typically, an amount of such dimer diamine in the range of about 1 pound per barrel (ppb) to about 3 ppb is sufficient for purposes of the invention. These fatty dimer diamines are prepared commercially from fatty dimer diacids which have been produced from dimerisation of vegetable oleic acid or tall oil fatty acid by thermal or acid catalyzed methods The dimerisation of C18 tall oil fatty acids produces the material leading to the C36 dimer acids. This material is a mixture of monocyclic dicarboxylic acid, acyclic dicarboxylic acid and bicyclic dicarboxylic acid along with small quantities of trimeric triacids. These diacids are converted into diamines via the reaction scheme given below:

Reaction Scheme I

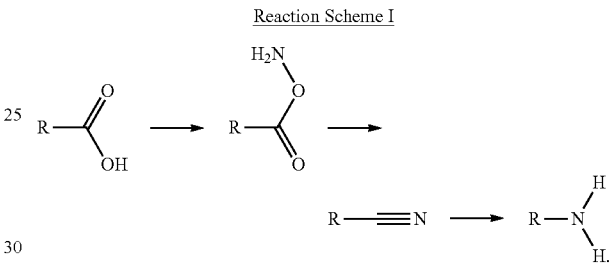

These diamines are further converted into compounds that fall under the scope of fatty dimer diamines. These diamines are converted into cyanoethyl derivatives via cyanoethylation with acrylonitrile; these cyanoethyl derivatives are further reduced into aminopropyl amines via reduction as shown in the reaction scheme II below, as taught in U.S. Pat. No. 4,250,045, issued Feb. 10, 1981 to Coupland, et al.

Reaction Scheme II

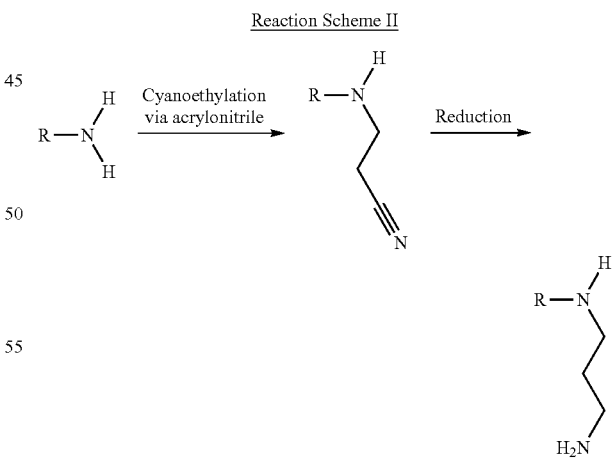

Dicyanoethylated dimer diamine is available commercially as Kemamine DC 3680 and 3695 and di N-aminopropylated dimer diamine is available commercially as Kemamine DD 3680 and 3695 from Chemtura Corporation USA. Different structures of the dimeric fatty dimer diamines are given below:

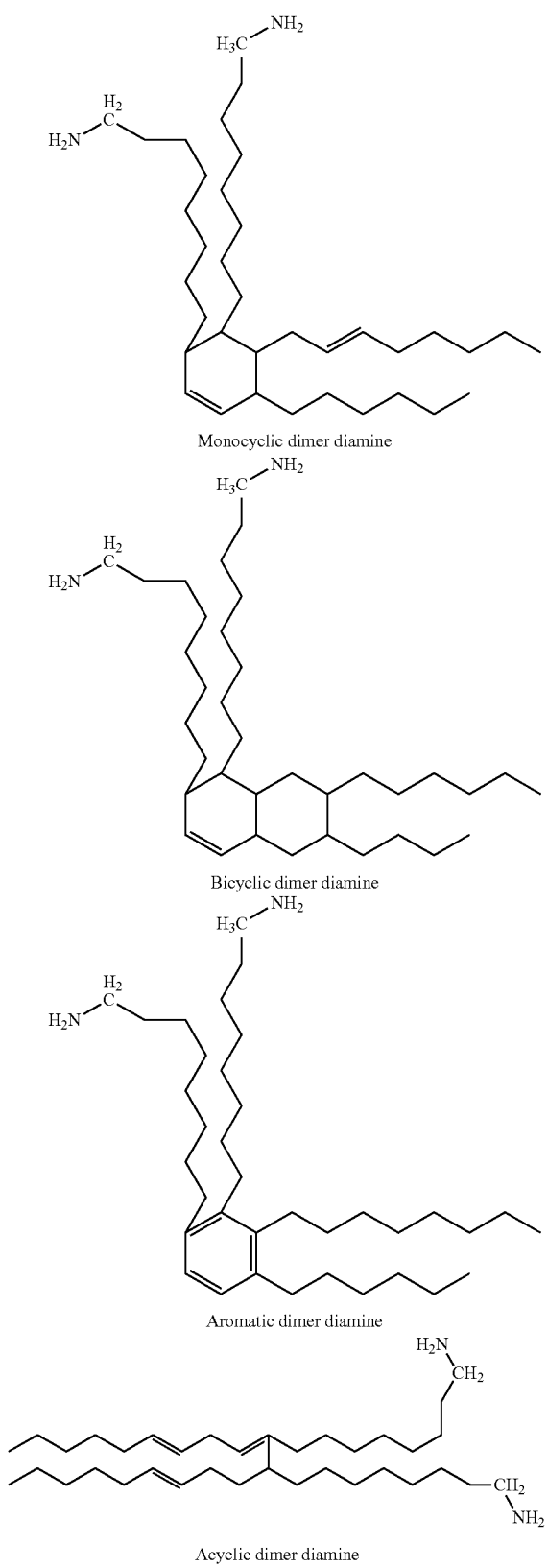

Monocyclic dimer diamine

Bicyclic dimer diamine

Aromatic dimer diamine

Acyclic dimer diamine

Other fatty dimer diamines suitable for use in the present invention include C28 fatty dimer diamines to C48 fatty dimer amines which are correspondingly prepared via dimerization of the relevant C14 to C24 fatty acids. It should be understood that C14 means the molecule contains in total 14 carbon atoms.

Laboratory tests demonstrate the effectiveness of the present invention. The following examples are included to demonstrate preferred embodiments. It should be appreciated by those of ordinary skill in the art that the techniques and compositions disclosed in the examples which follow represent techniques discovered by the inventors to function well and thus can be considered to constitute preferred modes of practice. However, those of ordinary skill in the art should, in light of the present disclosure, appreciate that many changes can be made in the specific embodiments which are disclosed and still obtain a like or similar result without departing from the scope of the claimed subject matter.

General Information Relevant to the Examples follows:

The following abbreviations are sometimes used in describing the results of experimentation:

"PV" is plastic viscosity, which is one variable used in the calculation of viscosity characteristics of a drilling fluid, measured in centipoise (cp) units, as further discussed below.

"YP" is yield point, which is another variable used in the calculation of viscosity characteristics of drilling fluids, measured in pounds per 100 square feet (lb/100 ft.sup.2), as further discussed below.

"GELS" is a measure of the suspending characteristics, or the thixotripic properties of a drilling fluid, measured in pounds per 100 square feet (lb/100 ft.sup.2).

"HTHP" is the term used for high-temperature high-pressure fluid loss, measured in milliliters (ml) according to *Recommended Practice* 13*B*-2, *Recommended Practice for Field Testing of Oil-based Drilling Fluids*, Fourth Edition, American Petroleum Institute, Mar. 1, 2005.

The components of the claimed drilling fluids include an oil or oleaginous fluid, an aqueous or a non-oleaginous fluid, an emulsifier package and a rheology modifier. Other chemicals used to make-up the system are basically the same as those typically used in formulating conventional invert emulsion drilling fluids.

All trademarked products in the tables below are available from Halliburton Energy Services, Inc., in Houston, Tex. and Duncan, Okla., except that REV DUST is an artificial drill solid available from Milwhite Inc, in Houston Tex.

The Plastic Viscosity (PV) and Yield Point (YP) of the invert emulsion drilling fluid were determined on a direct-indicating rheometer, a FANN 35 rheometer, powered by an electric motor. The rheometer consists of two concentric cylinders, the inner cylinder is called a bob, while the outer cylinder is called a rotor sleeve. The drilling fluid sample is placed in a thermostatically controlled cup and the temperature of the fluid is adjusted to 120 (±5) ° F. or the temperature of interest ±5° F. The drilling fluid in the thermostatically controlled cup is then placed in the annular space between the two concentric cylinders of the FANN 35. The outer cylinder or rotor sleeve is driven at a constant rotational velocity. The rotation of the rotor sleeve in the fluid produces a torque on the inner cylinder or bob. A torsion spring restrains the movement of the bob, and a dial attached to the bob indicates displacement of the bob. The dial readings are measured at different rotor sleeve speeds of 3, 6, 100, 200, 300 and 600 revolutions per minute (rpm).

Generally, Yield Point (YP) is defined as the value obtained from the Bingham-Plastic rheological model when extrapolated to a shear rate of zero. It may be calculated using 300 rpm and 600 rpm shear rate readings as noted above on a standard oilfield rheometer, such as a FANN 35 or a FANN 75 rheometer. Similarly, Yield Stress or Tau zero is the stress that must be applied to a material to make it begin to flow (or yield), and may commonly be calculated from rheometer readings measured at rates of 3, 6, 100, 200, 300 and 600 rpm. The extrapolation may be performed by applying a least-squares fit or curve fit to the Herchel-Bulkley rheological model. A more convenient means of estimating the Yield Stress is by calculating the Low-Shear Yield Point (LSYP) by the formula shown below in Equation 2 except with the 6 rpm and 3 rpm readings substituted for the 600-rpm and 300-rpm readings, respectively. Plastic Viscosity (PV) is obtained from the Bingham-Plastic rheological model and represents the viscosity of a fluid when extrapolated to infinite shear rate. The PV is obtained from the 600 rpm and the 300 rpm readings as given below in Equation 1. A low PV may indicate that a fluid is capable of being used in rapid drilling because, among other things, the fluid has low viscosity upon exiting the drill bit and has an increased flow rate. A high PV may be caused by a viscous base fluid, excess colloidal solids, or both. The PV and YP are calculated by the following set of equations:

$$PV = (600 \text{ rpm reading}) - (300 \text{ rpm reading}) \quad \text{(Equation 1)}$$

$$YP = (300 \text{ rpm reading}) - PV \quad \text{(Equation 2).}$$

More particularly, each of the experiments or tests were conducted in accordance with standard procedures set forth in *Recommended Practice* 13*B-2, Recommended Practice for Field Testing of Oil-based Drilling Fluids*, Fourth Edition, American Petroleum Institute, Mar. 1, 2005, the contents of which is hereby incorporated herein by reference and known to those of ordinary skill in the art.

Experiment 1

Two 12 ppg Invert Emulsion Fluids (IEFs) were formulated with a 2 ppb C36 fatty dimer diamine additive (BDF 570) (available from Halliburton Energy Services, Inc., in Duncan, Okla. and Houston, Tex.) in 12 ppg INNOVERT® clay-free invert emulsion drilling fluid (available from Halliburton Energy Services, Inc., in Duncan, Okla. and Houston, Tex.) in a 70:30 oil-water ratio having a 250K ppm $CaCl_2$ Water Phase Salinity (WPS). One of these IEFs included no lime and the other included 0.75 ppb lime. Both fluids were hot rolled for 16 hours at 250° F. and the rheologies determined on a FANN 35 rheometer according to API 13B-2. The rheology at temperatures less than room temperature were measured using a cold water rheology kit having a special sample cup that maintained temperatures below room temperature. The results are provided in Table 1.

TABLE 1

| | Mixing time min | Formulation | |
|---|---|---|---|
| | | 1 | 2 |
| Base oil for INNOVERT® drilling fluid system, ppb | | 150.5 | 150.5 |
| EZ MUL NT®, ppb | 2 | 11.00 | 11.00 |
| Lime, ppb | 2 | 0.00 | 0.75 |
| ADAPTA™, ppb | 5 | 2.00 | 2.00 |
| $CaCl_2$, ppb | | 29.30 | 29.30 |
| Water, ppb | 5 | 84.40 | 84.40 |
| Revdust, ppb | 5 | 20.00 | 20.00 |
| BAROID®, ppb | 10 | 204.70 | 204.70 |
| BDF™-570 C36 fatty dimer diamine additive, ppb | 5 | 2.00 | 2.00 |

| Hot rolled at 250 F., 16 hrs | 40 F. | 80 F. | 120 F. | 150 F. | 40 F. | 80 F. | 120 F. | 150 F. |
|---|---|---|---|---|---|---|---|---|
| 600 rpm | 193 | 133 | 116 | 104 | 188 | 85 | 58 | 46 |
| 300 rpm | 115 | 89 | 81 | 73 | 111 | 50 | 33 | 25 |
| 200 rpm | 86 | 71 | 69 | 62 | 82 | 37 | 25 | 18 |
| 100 rpm | 58 | 51 | 53 | 49 | 52 | 24 | 16 | 11 |
| 6 rpm | 26 | 26 | 29 | 34 | 17 | 6 | 5 | 4 |
| 3 rpm | 25 | 25 | 28 | 33 | 15 | 5 | 4 | 3 |
| PV | 78 | 44 | 35 | 31 | 77 | 35 | 25 | 21 |
| YP | 37 | 45 | 46 | 42 | 34 | 15 | 8 | 4 |
| HTHP, 250 F., ml | | 1 ml | | | | 1 ml | | |
| Gel strength 10 sec | 32 | 32 | 35 | 37 | 14 | 6 | 5 | 5 |
| Gel strength 10 min | 45 | 37 | 43 | 40 | 17 | 10 | 11 | 10 |

Table 1 shows that the invert emulsion fluid containing no lime (Fluid Formulation 1—an Invert Emulsion Fluid (IEF) of the present invention) had a YP of 41+/−4 from 40° F. to 150° F. and a GEL at 10 min in the range of 41+/−4 from 40° F. to 150° F. The invert emulsion fluid with 0.75 ppb lime (Fluid Formulation 2) had a YP of 34 at 40° F. which decreased gradually to 4 at 150° F. and a GEL at 10 min of 17 that decreased gradually to 10 at 150° F. These results for Experiment 1 indicate that the YP and GELS of Fluid Formulation 2 containing lime and the C36 fatty dimer diamine were dependent on temperature but the fluid without lime and containing the C36 fatty dimer diamine was relatively independent of changes in temperature and pressure.

Experiment 2

Fluid Formulation 1, an IEF of the invention, containing the C36 fatty dimer diamine additive and no lime, was tested further on a FANN 75 rheometer at temperatures ranging from 120° F. to 325° F. and at pressures from 0 psi to 13500 psi. The results are shown in Table 2.

TABLE 2

| RPM | 120° F./ 0 psi | 150° F./ 3000 psi | 175° F./ 4500 psi | 200° F./ 6000 psi | 225° F./ 7500 psi | 250° F./ 9000 psi | 275° F./ 10500 psi | 300° F./ 12000 psi | 325° F./ 13500 psi |
|---|---|---|---|---|---|---|---|---|---|
| 600 | 119 | 119 | 120 | 116 | 113 | 112 | 113 | 113 | 118 |
| 300 | 84 | 84 | 86 | 87 | 86 | 84 | 83 | 82 | 85 |
| 200 | 71 | 71 | 73 | 75 | 75 | 73 | 72 | 71 | 72 |
| 100 | 57 | 59 | 62 | 64 | 63 | 60 | 57 | 55 | 57 |
| 6 | 34 | 37 | 40 | 40 | 37 | 33 | 30 | 29 | 31 |
| 3 | 33 | 37 | 40 | 39 | 35 | 31 | 29 | 28 | 33 |
| PV | 35 | 35 | 34 | 29 | 27 | 28 | 30 | 31 | 33 |
| YP | 49 | 49 | 52 | 58 | 59 | 56 | 53 | 51 | 52 |
| LSYP | 32 | 37 | 40 | 38 | 33 | 29 | 28 | 27 | 35 |

To calculate the temperature gradient in terms of ° F./100 ft, first depth is calculated by using the following formula: Hydrostatic Pressure (HP)=0.052*MW*depth. Hence, Depth=HP/(0.052*MW). As indicated above, Mud Weight (MW) was 12 lbs per barrel or ppg. To calculate the temperature gradient, the following formula is used:

temperature gradient=[(temperature at a given depth−surface temperature)/depth]*100

For a surface temperature of 40° F., the temperature gradient would be as follows:

| temp | HP | depth | temp gradient ° F./100 ft |
|---|---|---|---|
| 150 | 3000 | 4807.7 | 2.3 |
| 175 | 4500 | 7211.5 | 1.9 |
| 200 | 6000 | 9615.4 | 1.7 |
| 225 | 7500 | 12019.2 | 1.5 |
| 250 | 9000 | 14423.1 | 1.5 |
| 275 | 10500 | 16826.9 | 1.4 |
| 300 | 12000 | 19230.8 | 1.4 |
| 325 | 13500 | 21634.6 | 1.3 |

For a surface temperature of 70° F., the temperature gradient would be as follows:

| temp | HP | depth | temp gradient ° F./100 ft |
|---|---|---|---|
| 150 | 3000 | 4807.7 | 1.7 |
| 175 | 4500 | 7211.5 | 1.5 |
| 200 | 6000 | 9615.4 | 1.4 |
| 225 | 7500 | 12019.2 | 1.3 |
| 250 | 9000 | 14423.1 | 1.2 |
| 275 | 10500 | 16826.9 | 1.2 |
| 300 | 12000 | 19230.8 | 1.2 |
| 325 | 13500 | 21634.6 | 1.2 |

Hence a temperature gradient of 1° F. to about 2.1° F. per 100 feet of depth is obtained.

Table 2 indicates that the YP for this IEF was in the range of 54+/−4 for this temperature range, and was relatively flat across the temperature and pressure profile. The differences in the FANN 75 YP and the FANN 35 YP are believed to be due to instrumental errors, since the determinations were performed on two different occasions on two different instruments.

When the results set forth in Tables 1 and 2 are considered with respect to the temperature gradient, they indicate that the yield point and 10 minute gel strength of the fluid of the invention will be about the same along the depth of a well during drilling, for example from 0 feet to 20,000, with the temperature in the well increasing at a rate of about 1° F. to about 2.1° F. per 100 feet of depth.

Experiment 3

A 12 ppg Invert Emulsion Fluid (IEF) was again formulated with 2 ppb C36 fatty dimer diamine additive (BDF 570) (available from Halliburton Energy Services, Inc., in Duncan, Okla. and Houston, Tex.) in 12 ppg INNOVERT® clay-free invert emulsion drilling fluid (available from Halliburton Energy Services, Inc., in Duncan, Okla. and Houston, Tex.), but in a different oil-water ratio. In this experiment, an oil-water ratio of 80:20 was used—having a 250K ppm $CaCl_2$ Water Phase Salinity (WPS). The IEF contained no lime. The fluid was hot rolled for 16 hours at 250° F. and the rheologies determined on a FANN 35 rheometer according to API 13B-2. The results are provided in Table 3.

TABLE 3

| Formulation 3 | | |
|---|---|---|
| | Mixing time min | |
| Base oil for INNOVERT® drilling fluid system, ppb | | 173.4 |
| EZ MUL NT®, ppb | 2 | 11.00 |
| Lime, ppb | 2 | 0.00 |
| ADAPTA™, ppb | 5 | 2.00 |
| $CaCl_2$, ppb | | 19.50 |
| Water, ppb | 5 | 56.20 |
| Revdust, ppb | 5 | 20.00 |
| BAROID®, ppb | 10 | 220.90 |
| BDF™-570 C36 fatty dimer diamine additive, ppb | 5 | 1.50 |

| | Hot rolled at 250 F., 16 hrs | | | |
|---|---|---|---|---|
| | 40° F. | 80° F. | 120° F. | 150° F. |
| 600 rpm | 174 | 116 | 107 | 94 |
| 300 rpm | 104 | 76 | 74 | 66 |
| 200 rpm | 80 | 61 | 63 | 54 |
| 100 rpm | 51 | 45 | 50 | 40 |

TABLE 3-continued

| | | | | |
|---|---|---|---|---|
| 6 rpm | 21 | 25 | 21 | 17 |
| 3 rpm | 21 | 24 | 19 | 16 |
| PV | 70 | 40 | 33 | 28 |
| YP | 34 | 36 | 41 | 38 |
| HTHP, 250 F., ml | | 1 ml | | |
| Gel strength 10 sec | 31 | 30 | 27 | 29 |
| Gel strength 10 min | 58 | 52 | 49 | 50 |

Table 3 indicates that the YP for this IEF of the invention (Fluid Formulation 3) was in the range of 37.5+/−3.5 from 40° F. to 150° F. and the GEL at 10 min was in the range of 53+/−4 from 40° F. to 150° F. Thus the YP and GELS at 10 min were relatively independent of temperature and pressure at this high oil-water ratio for Fluid Formulation 3.

Experiment 4

A 12 ppg Invert Emulsion Fluid (IEF) was again formulated with 2 ppb C36 fatty dimer diamine additive (BDF 570) (available from Halliburton Energy Services, Inc., in Duncan, Okla. and Houston, Tex.) in 12 ppg INNOVERT® clay-free invert emulsion drilling fluid (available from Halliburton Energy Services, Inc., in Duncan, Okla. and Houston, Tex.), but in still another different oil-water ratio—a ratio of 60:40—and having a 250K ppm $CaCl_2$ Water Phase Salinity (WPS). The IEF also had a low mud weight—9 ppg—and contained no lime. The fluid was hot rolled for 16 hours at 250° F. and the rheologies determined on a FANN 35 rheometer according to API 13B-2. The results are provided in Table 4.

TABLE 4

Formulation 4

| | Mixing time min | |
|---|---|---|
| Base oil for INNOVERT ® drilling fluid system, ppb | | 149.4 |
| EZ MUL NT ®, ppb | 2 | 8.00 |
| Lime, ppb | 2 | 0.00 |
| ADAPTA ™, ppb | 5 | 2.00 |
| $CaCl_2$, ppb | | 33.40 |
| Water, ppb | 5 | 128.60 |
| Revdust, ppb | 5 | 20.00 |
| BAROID ®, ppb | 10 | 34.60 |
| BDF ™-570 C36 fatty dimer diamine additive, ppb | 5 | 2.00 |

| | Hot rolled at 250 F., 16 hrs | | | |
|---|---|---|---|---|
| | 40 F. | 80 F. | 120 F. | 150 F. |
| 600 rpm | 163 | 100 | 80 | 65 |
| 300 rpm | 94 | 61 | 50 | 42 |
| 200 rpm | 70 | 47 | 39 | 35 |
| 100 rpm | 44 | 31 | 27 | 25 |
| 6 rpm | 11 | 11 | 13 | 17 |
| 3 rpm | 10 | 10 | 13 | 17 |
| PV | 69 | 39 | 30 | 23 |
| YP | 25 | 22 | 20 | 19 |
| HTHP, 250 F, ml | | | 2 ml | |
| Gel strength 10 sec | 13 | 16 | 19 | 20 |
| Gel strength 10 min | 27 | 22 | 19 | 20 |

Table 4 indicates that the YP for this IEF embodiment of the invention (Fluid Formulation 4) was in the range of 22+/−3 from 40° F. to 150° F. and the GEL at 10 min was in the range of 23+/−4 from 40° F. to 150° F. Thus the YP and GELS at 10 min were again relatively independent of temperature and pressure at this oil-water ratio for Fluid Formulation 4.

Experiment 5

The C36 fatty dimer diamine additive used in the invention was tested for environmental compatibility with ecotoxicity studies. North Sea regulations require that offshore chemicals show a LC50 value of greater than 10 mg/L and a biodegradability of greater than 60%. The C36 dimer diamine additive of the present invention met these requirements, as indicated in Table 5 below.

TABLE 5

| Tests | | |
|---|---|---|
| Biodegradation | 28 days | 66.5% |
| | 35 days | 82.1% |
| Skeletonema | 72-hr EC50 | 23 mg/l |
| | 72-hr EC90 | 29 mg/l |
| Acartia Tonsa | 24-hr LC50 | >10000 mg/l |
| | 48-hr LC90 | |
| Cyprinodon variegatus | 48-hr LC50 | >10000 mg/l |
| | 96-hr LC50 | |

Specifically, the C36 dimer diamine additive of the invention showed an LC50 value greater than 10 mg/l for each of the toxicity tests conducted and also showed 66.5% biodegradability after 28 days.

The advantages of the methods of the invention may be obtained by employing a drilling fluid of the invention in drilling operations. The drilling operations—whether drilling a vertical or directional or horizontal borehole, conducting a sweep, or running casing and cementing—may be conducted as known to those of ordinary skill in the art with other drilling fluids. That is, a drilling fluid of the invention is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid in accordance with the present invention is optimized for the particular drilling operation and for the particular subterranean formation characteristics and conditions (such as temperatures). For example, the fluid is weighted as appropriate for the formation pressures and thinned as appropriate for the formation temperatures. The fluids of the invention afford real-time monitoring and rapid adjustment of the fluid to accommodate changes in such subterranean formation conditions. Further, the fluids of the invention may be recycled during a drilling operation such that fluids circulated in a wellbore may be recirculated in the wellbore after returning to the surface for removal of drill cuttings for example. The drilling fluid of the invention may even be selected for use in a drilling operation to reduce loss of drilling mud during the drilling operation and/or to comply with environmental regulations governing drilling operations in a particular subterranean formation.

The foregoing description of the invention is intended to be a description of preferred embodiments. Various changes in the details of the described fluids and methods of use can be made without departing from the intended scope of this invention as defined by the appended claims.

What is claimed is:
1. A method for drilling a well in a subterranean formation comprising:
providing an invert emulsion drilling fluid having an oleaginous continuous phase, a non-oleaginous discontinu- ous phase, a rheology modifier comprising a fatty dimer diamine additive, and less than 0.3 ppb lime; and drilling at least a portion of the well in at least a portion of the subterranean formation while the invert emulsion drilling fluid is circulated in the well.

2. The method of claim 1 wherein the drilling fluid has a yield point that is about the same at temperatures ranging from about 40° F. to about 180° F.

3. The method of claim 2 wherein the drilling fluid comprises from about 0.25 ppb to about 18 ppb of fatty dimer diamine.

4. The method of claim 1 wherein the drilling fluid has a 10 minute gel strength that is effectively the same at temperatures ranging from about 40° F. to about 180° F.

5. The method of claim 1 wherein drilling fluid has a yield point that is about the same at pressures ranging from about 0 to about 5000 psi and at temperatures ranging from 40° F. to 180° F.

6. The method of claim 1 wherein the drilling fluid has a 10 minute gel strength that is about the same at pressures ranging from about 0 to about 5000 psi and at temperatures ranging from 40° F. to 180° F.

7. The method of claim 1 wherein the drilling fluid comprises no lime.

8. The method of claim 1 wherein the fatty dimer diamine has 28 to 48 carbon atoms per molecule.

9. The method of claim 1 wherein the drilling fluid is organophilic clay-free.

10. The method of claim 1 wherein the fluid has a yield point and a 10 minute gel strength that are each about the same along the depth of the well during drilling from 0 feet to 20,000 feet with the temperature in the well increasing at a rate of about 1° F. to about 2.1° F. per 100 feet of depth.

11. The method of claim 1 wherein the oleaginous continuous phase comprises: a synthetic oil comprising an ester or olefin; a diesel oil; or a mineral oil selected from the group consisting of n-paraffins, iso-paraffins, cyclic alkanes, branched alkanes, and mixtures thereof.

12. The method of claim 1 wherein the non-oleaginous discontinuous phase is an aqueous solution containing a water activity lowering material selected from the group consisting of: alcohols; sugar; salts selected from the group consisting of calcium chloride, calcium bromide, sodium chloride, sodium bromide, and formate; and combinations thereof.

13. The method of claim 1 wherein the invert emulsion fluid comprises at least one additive selected from the group consisting of: a weighting agent; an inert solid; a fluid loss control agent; an emulsifier; a salt; a dispersion aid; a corrosion inhibitor; an emulsion thinner; an emulsion thickener; a viscosifier; an HPHT emulsifier-filtration control agent; and any combination thereof.

14. The method of claim 13 wherein the weighting agents are selected from the group consisting of: barium sulfate; heamatite; calcium carbonate; and any combination thereof.

15. The method of claim 1 wherein the drilling fluid has a mud weight in the range of about 9 ppg to about 18 ppg.

16. The method of claim 1 wherein the drilling fluid has an oil:water ratio in the range of about 50:50 to about 95:5.

17. The method of claim 1 further comprising drilling, running casing and/or cementing the well in the subterranean formation.

18. A method for drilling in a subterranean formation comprising:

providing an invert emulsion drilling fluid having an oleaginous continuous phase, a non-oleaginous discontinuous phase, a fatty dimer diamine, and less than 0.3 ppb lime, wherein the drilling fluid has a yield point and a gel strength that are each effectively the same at temperatures ranging from about 40° F. to about 180° F.; and drilling at least a portion of a wellbore in at least a portion of the subterranean formation while the invert emulsion drilling fluid is circulated in the wellbore.

19. The method of claim 18 wherein the drilling fluid comprises no lime.

20. The method of claim 18 wherein the fatty dimer diamine has 28 to 48 carbon atoms per molecule.

21. The method of claim 18 wherein the drilling fluid is organophilic clay-free.

22. The method of claim 18 wherein the oleaginous continuous phase comprises: a synthetic oil comprising an ester or olefin; a diesel oil; or a mineral oil selected from the group consisting of n-paraffins, iso-paraffins, cyclic alkanes, branched alkanes, and mixtures thereof.

23. The method of claim 18 wherein the drilling fluid has a mud weight in the range of about 9 ppg to about 18 ppg.

24. The method of claim 18 wherein the drilling fluid comprises from about 0.25 ppb to about 18 ppb of the fatty dimer diamine.

25. The method of claim 18 wherein the drilling fluid has an oil:water ratio in the range of about 50:50 to about 95:5.

26. The method of claim 18 further comprising running casing and/or cementing in the wellbore in the subterranean formation.

27. A method for drilling a well in a subterranean formation comprising:

providing an invert emulsion drilling fluid that consists essentially of an oleaginous continuous phase, a non-oleaginous discontinuous phase, a rheology modifier comprising a fatty dimer diamine additive, and less than 0.3 ppb lime; and drilling at least a portion of the well in at least a portion of the subterranean formation while the invert emulsion drilling fluid is circulated in the well.

* * * * *